US007005938B1

(12) United States Patent
Baradaran

(10) Patent No.: US 7,005,938 B1
(45) Date of Patent: Feb. 28, 2006

(54) SOFTWARE CONTROLLABLE TERMINATION NETWORK FOR HIGH SPEED BACKPLANE BUS

(75) Inventor: Hamid R. Baradaran, Novato, CA (US)

(73) Assignee: Alcatel USA Sourcing, L.P., Plano, TX (US)

( * ) Notice: Subject to any disclaimer, the term of this patent is extended or adjusted under 35 U.S.C. 154(b) by 0 days.

(21) Appl. No.: 09/188,815

(22) Filed: Nov. 9, 1998

(51) Int. Cl.
*H04L 12/50* (2006.01)

(52) U.S. Cl. ...................................... 333/17.3; 370/359

(58) Field of Classification Search ................ 370/359, 370/419, 451; 333/17.3, 17.1, 22 R, 24 R
See application file for complete search history.

(56) References Cited

U.S. PATENT DOCUMENTS 4,481,574 A * 11/1984 DeFino et al. ........... 379/93.01
4,920,339 A 4/1990 Friend et al. ............... 340/825
5,117,331 A 5/1992 Gebara ....................... 361/407
5,309,569 A 5/1994 Warchol ..................... 395/325
5,479,123 A 12/1995 Gist et al. ................... 327/108
5,553,250 A 9/1996 Miyagawa et al. ......... 395/309
5,583,867 A * 12/1996 Poole ......................... 370/257
5,726,583 A 3/1998 Kaplinsky .................... 326/30
6,229,814 B1 * 5/2001 McMillian et al. ......... 370/420

FOREIGN PATENT DOCUMENTS

EP 0 489 510 6/1992

OTHER PUBLICATIONS

Motorola Web Page: *DSLAM:Digital Subscriber Line Access Miltiplexer*.
David C. Lee; Eric Hallnor *Asymmetric Digital Subscriber Line (ADSL), EE 4984: Telecommunication Networks* Apr. 15, 1997.
ADSL Web Page, *General Introduction to Copper Access Technologies*.

* cited by examiner

*Primary Examiner*—Wellington Chin
*Assistant Examiner*—Brenda Pham
(74) *Attorney, Agent, or Firm*—Fliesler, Dubb, Meyer & Lovejoy, LLP; Bobby D. Slaton; V. Lawrence Sewell

(57) ABSTRACT

A line card provides terminating resistors for a bus or traces on a backplane. The line card terminations are activated (connected to ground) by a crossbar switch that is set according to programming (software/firmware/flash memory stored instructions) maintained on the line card to set the state of the resistive terminations. The programming maintained on the line card may be downloaded to the card into nonvolatile storage. The decision to utilize a specific line card to terminate or leave the bus unterminated is made by a control unit that sends command messages to the line card. A polling device interrogates each line card and sets the physically last card on the bus as a terminating card. The command messages are in ADSL Provisioning Message format and transmitted to each line card via a CPU Cell Data Link (CCDL).

45 Claims, 6 Drawing Sheets

SOFTWARE CONTROLLABLE TERMINATION NETWORK FOR HIGH SPEED BACKPLANE BUS

BACKGROUND OF THE INVENTION

1. Field of the Invention

This invention relates to the termination of electrical traces. The invention is more particularly related to the termination of traces on a card connected to a backplane. The invention is still further related to programmable resistive terminations that either terminate or do not affect traces on a card. The invention is yet further related to a line card having traces with programmable terminations controlled by a command message.

2. Discussion of the Background

Modern electronic intensive systems come in many configurations. Typically, large electronic intensive systems include a chassis having a backplane and line cards. The backplane carries electrical lines to the line cards, and normally includes a bus shared between the line cards. The line cards have connectors that physically attach the line card to the chassis and electrically connect the line card and its associated electronic devices to the backplane and bus.

One modern electronic system having such a configuration is an access device utilized by a local telephone company to access voice traffic from a high capacity network. FIG. 1 illustrates an example of an access device (terminal unit) 150 installed at a central office 100 of a local telephone company.

In FIG. 1, a narrowband switch 110 resident in the Central Office 100 is connected via a fiber link to a narrowband network 120 carrying time-domain multiplexed (TDM) traffic. The narrowband network 120 includes addition links to long distance lines 130, for example. The voice switch 110 routes narrowband (voice and data, for example) traffic to and from a terminal unit 150 via connecting cable 140. The terminal unit 150 multiplexes signals between the voice switch 110 and customers 1 . . . m 160.

FIG. 2 illustrates the terminal unit 150 in greater detail. A control shelf 200 sends and accepts signals (narrowband traffic in this example) to/from the connecting cable 140. The control shelf 200 multiplexes the signals between the connecting cable and plural bank controller units (BCUs) $\mathbf{220}_1 \ldots \mathbf{220}_n$. Each BCU is located on a respective shelf of channel bank shelves $\mathbf{210}_1 \ldots \mathbf{210}_n$. Each of shelves $\mathbf{210}_1 \ldots \mathbf{210}_n$ support one or more rows (row 230, for example) having slots $s_1 \ldots s_p$ of row 230 for installing line cards.

Each BCU multiplexes signals between its respective rows of line cards and the control shelf 200. Thus high density traffic received by the control shelf 200 is multiplexed to plural BCUs, and the BCUs multiplex traffic to individual line cards installed in line card rows maintained in a respective shelf of the BCU. The individual line cards communicate traffic between the terminal unit 150 and customers 1 . . . m. Traffic from customers 1 . . . m to the narrowband network 120 is handled in reverse order.

As with electronic devices of similar physical configuration, each of shelves $\mathbf{220}_1 \ldots \mathbf{220}_n$ include a backplane. The backplane provides signal lines to communicate data and control information between the BCU and individual cards, or between any two or more cards in each row, depending on the electrical configuration of the system, and typically includes at least one bus.

A backplane utilized by the terminal unit 150 is illustrated in FIG. 3. The BCU 220 is connected to a bus 300 that includes x individual lines for addressing and data. The bus 300 is connected to plural line cards ($lc_i \ldots lc_p$), and a bus termination 310. Referring to FIG. 4, the bus termination 310 provides a resistive termination to ground ($R_1 \ldots R_x$) for each of the individual lines 1 . . . x of the bus 300.

The bus terminations are vitally important in the operation of a high speed bus. The terminations sink signals, transmitted on the bus to ground, minimizing reflection of signals that reach the end of the bus. The resistence selected for the terminations is also extremely important because it affects the amount of current needed to drive transmitted signals, and can either inhibit or accelerate rise times of the signal carried on the bus.

The present inventor has realized that in certain situations it is not feasible to terminate backplane traces on the backplane and that the terminations may be accomplished on one of the line cards instead. This is the case, for example, where there is already a large installed base of systems having previously unused backplane traces which are unterminated, and with the advance of technology it is desirable to provide new line cards which utilize the previously unused traces. In the system of FIGS. 1–4, for example, the point-to-point subscriber bus was used exclusively for narrowband telephony traffic. Whereas these traces were terminated on the backplane a previously mentioned, the backplane also included a number of extra traces which were unused and unterminated. Technological advances have made it possible to carry much more information at much higher speeds (specifically ADSL "broadband" traffic) by taking advantage of the previously unused traces, through the creation of new bank control units (called ABCUs) and new line cards (called ADLUs) to be retrofitted into the installed base of systems. But in order to do so, the extra traces somehow need to be terminated. Otherwise the reflections and other noise that will appear on such traces will seriously impact the reliability of the new broadband traffic capacity.

One possibility, of course, would be to retrofit the backplanes in each system with new termination resistors on the extra traces. Such a solution would be commercially undesirable because of the enormous expense of sending numerous skilled technicians out to thousands of installations to perform the retrofit.

Another possibility would be to terminate the extra traces on the new line cards themselves. However, a single row 230 in a channel bank shelf 210, can contain any number of line cards (up to 20 in this example), and the number and physical placement along the backplane of the line cards will vary from system to system. If all line cards that are newly installed in a system are resistively grounding the backplane traces, then the loading on the trace would be unpredictable (because the number of new line cards is unpredictable), and typically much too heavy.

It might be possible to manufacture some line cards that do have resistive terminations and some that do not, but then certain economies of scale in production would be lost. In addition, because the terminations should be a close to the end of the backplane traces a possible (farthest from the ABCU), the effectiveness of the terminations, and therefore the reliability of broadband communications within the system, would depend on the uncertain dependability of each system operator installing the correct type of line card in the correct slot on the backplane.

Yet another possibility might be to include termination resistors on all of the new line cards, and provide a switch for a technician to activate or deactivate the terminations on a card-by-card basis. This solution avoids degradation of production economies, because all line cards re identical, but again depends for its effectiveness on the reliability of each system operator to activate the termination resistors on the card farthest from the ABCU, and only on that card.

It can be seen that the promise of high speed broadband telephony traffic enhancing a large installed base of conventional telephony systems, might be realizable only if the problem of resistive terminations of previously unterminated spare backplane traces can be solved properly. There is therefore a strong need for a technique for terminating such backplane traces which is commercially feasible, which does not risk heavy or unpredictable loading of the traces, which does not degrade production economies, and which does not depend for its reliability on system operators' manual tasks when installing new line cards into an existing system.

SUMMARY OF THE INVENTION

Accordingly, it is an object of this invention to provide a line card having programmable terminations.

It is another object of the present invention to provide a method of operating a line card having programmable terminations.

It is another object of the present invention to provide a line card having programming that responds to commands to program terminations present on the line card, or to commands requesting current status of such terminations.

It is yet another object of the present invention to provide programmable terminations in a line card for terminating Asynchronous Digital Subscriber Line (ADSL) traces on the line card utilized for communicating ADSL traffic.

These and other objects are accomplished by a line card having at least one programmable resistor termination, and means for receiving commands for programming or returning status about the at least one resistor termination. The line card includes at least one trace, and at least one switch. Each resistor termination is connected at one end to a termination terminal (one of a ground, artificial ground, and a reference), and a switch at a second end. Each switch is directed by said programming to one of connect and disconnect the resistor termination to a corresponding one of said traces.

The means for receiving commands includes a connection device configured to connect said line card device to a backplane, and a command reading device configured to read and accept commands sent to the line card device from a command unit across the backplane.

The present invention also includes a method of operating a line card having programmable terminations. The method includes the steps of receiving at least one command from a command unit indicating a state of the resistor terminations, and executing the received commands by performing steps necessary to place the resistor terminations in the indicated state. The step of executing includes identifying resistor terminations corresponding to a command received, determining a programmed state for the corresponding resistor terminations according to the command received, and directing the corresponding resistor terminations to the programmed state.

The present invention also includes a method for determining status of programable terminations on a line card. First, the line card receives a command requesting status of the programable terminations. Then, the line card either determines the current status of the programable terminations. Then, the line card either determines the current status or retrieves the current status from a preset location and responds to the command with a message indicating the status of the programable terminations.

The present inventor has realized that electronic devices have been constructed with backplanes having additional lines without a purpose (or present intent to carry either data or control signals) at the time of construction, these additional lines are often referred to as unused traces (see 350, FIG. 3, for example) and may or may not be connected to installed line cards.

The present inventor has also realized that when additional functionality is added to an electronic device by utilizing unused traces, particularly in a case where fast rise times and clocking rates of data are to be transferred across the traces, that a line card having programmable resistive terminations may be utilized to implement line terminations on the previously unused traces. The invention replaces the need to send technicians into the field to upgrade the backplane (to include proper terminations) and thereby upgrade the entire system to utilize the added functionality.

The present inventor has also realized that the present invention may be applied to other electronic devices and for other purposes where programmable resistive functions would be useful.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 5A:
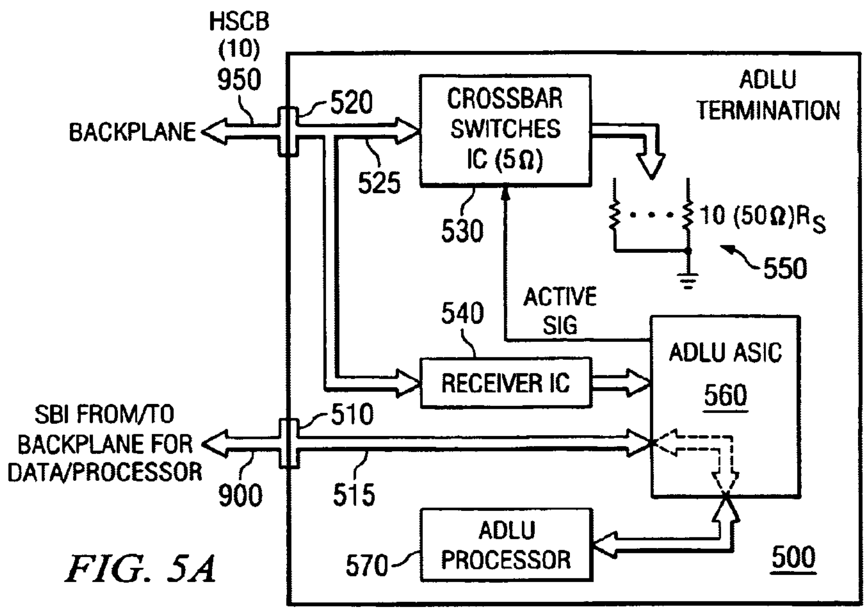
FIG. 5A is a block diagram of related parts of a line card according to the present invention.

Referring again to the drawings, wherein like reference numerals designate identical or corresponding parts throughout the several views, and more particularly to FIG. 5A thereof, there is illustrated a programmable ADLU line card 500 having programmable resistive terminations according to the present invention (hardware for implementing the present invention is shown, other hardware is also present to perform various communication and other functions (not shown)).

The ADLU line card 500 includes connections 510 and 520 respectively connecting line card traces 515 and 525 to a terminated backplane bus 900 and the unterminated backplane bus 950 (unterminated backplane bus 950 may either be completely unterminated or have high value resistors (1_k_, for example, not shown), effectively leaving the bus unterminated.). In this example, the terminated backplane bus 900 is a subscriber bus (hereinafter subscriber bus 900), and the unterminated backplane bus 950 is a High Speed Cell Bus (hereinafter HSCB 950).

The HSCB 950 is connected via traces 525 to a set of crossbar switches 530 and a Receiver 540. The crossbar switches 530 are present in an IC device and are configured to one of connect and disconnect each of traces 525 to individual termination resistors 550 (i.e., each trace having its own resistor either connected or disconnected by a respective crossbar switch). The termination resistors are connected at one end to the crossbar switches and grounded at an opposite end. Although ten 50 Ω resistors 550 are shown, the programable terminations may alternatively be constructed of any impedance device including capacitive, inductive or resistor networks, for example.

Other configurations are possible within the scope of the present invention. For example, the HSCB unterminated bus 950 includes 10 lines, 8 data and 2 clock lines, however, additional or individual lines may similarly be accommodated by additional switches and resistors. As another example, the crossbar switches may alternatively be placed between the resistors and ground, and a type of switch other than crossbar may be utilized.

When the crossbar switches are activated (closed, making a connection), the terminating resistors 550 are connected to the HSCB lines and ground, providing a termination resistance for the HSCB 950. When the crossbar switches are open, the HSCB 950 is not provided termination by the programmable line card. Although the illustrated configuration either terminates or leaves open the entire HSCB bus, in another embodiment the crossbar switches may be individually activated, terminating specific lines while leaving other lines without termination.

The receiver 540 receives various commands present on the HSCB 950 via traces 525. The commands received include various board configuration messages, such as a termination activation message, and other commands related to processing performed on the ADLU line card 500. The commands received are transferred to an ADLU ASIC 560 and an ADLU processor 570. The ADLU processor 570 interprets the various commands and performs steps necessary to implement each command. The ADLU processor may perform each step or invoke a sequence of steps programmed into the ADLU ASIC 560 or other storage medium.

Steps performed by the ADLU processor 570 may be stored in either the ADLU ASIC 560 or other storage medium maintained on the ADLU line card 500. A non-volatile memory such as EEPROM or flash memory device would suffice. In the case of an electronically updated memory device, the steps (programming) of ADLU processor 570 may be downloaded to the storage medium or ASIC 560 across the subscriber bus 900 or the HSCB 950.

Figure 5B:
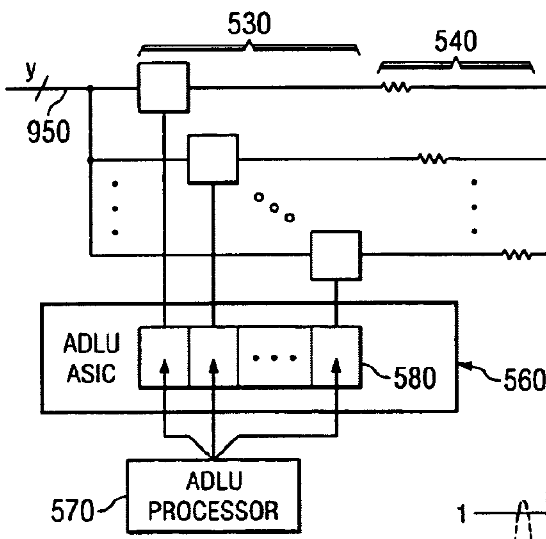
FIG. 5B is a block diagram illustrating one embodiment of a termination state register according to the present invention.
Figure 6:
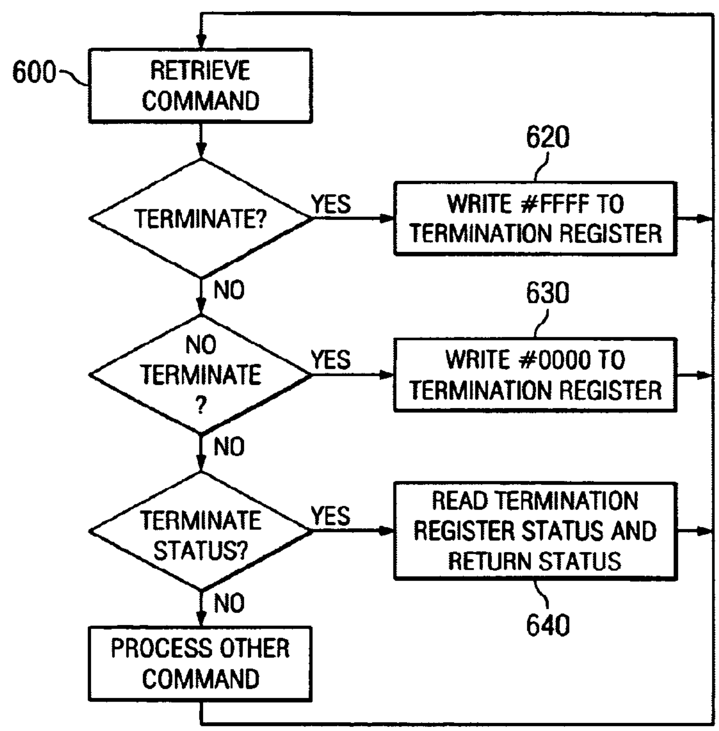
FIG. 6 is a flow chart illustrating an example program flow for programming controlling programmable resistive terminations according to the present invention.

Example steps performed by ADLU processor 570 in interpreting and carrying out a termination command received off the HSCB 950 are illustrated in the flow chart of FIG. 6. At step 600, a command is retrieved from the HSCB 950 (passed to the ADLU processor by ADLU ASIC 560, after verifying ADLU addressing, etc.) and is interpreted. If the command is a terminate resistors command, the ADLU processor writes a series of ones (#FFFF, for example) (step 620) to termination state register 580 (see FIG. 5B). If the command is no-termination, the ADLU processor writes a series of zeros (#0000, for example) (step 630) to the termination state register 580. Other variations of the program described in FIG. 6 are possible.

A command may also be received for retrieve the terminator status of the programmable resistor terminations. In one embodiment, the termination status register is read, the contents are evaluated, and the status of the programable resistor terminations is returned (step 640). In another embodiment, the status of the resistor terminations may be retrieved from a storage location previously set in accordance with the state of the resistor terminations.

Figure 5C:
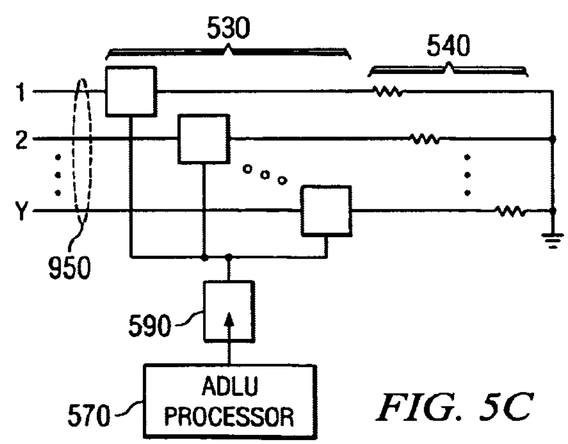
FIG. 5C is a block diagram illustrating a second embodiment of the termination state register according to the present invention.

The termination state register 580 is maintained in the ADLU ASIC 560 or other electronics, and is connected to an activation input of the crossbar switches 530. In one embodiment, a single register value is applied to each activation input, thus placing each of crossbar switches in a same position (open or closed)(see termination state register 590, FIG. 5C). In the alternative embodiment (termination state register 580, FIG. 5B), each activation input is tied to an individual register bit, providing for individual programmability of the switches. In yet another embodiment, the termination register is not utilized, and instead of writing to the termination register, the crossbar switches are directly activated by the steps performed.

The ADLU Processor 570 and ASIC 560 are configured to perform any number of other functions with regard to the transfer of data from either of the attached HSCB and SBI busses. In addition, the ADLU line card 500 is configured to carry ADSL traffic.

Figure 1:
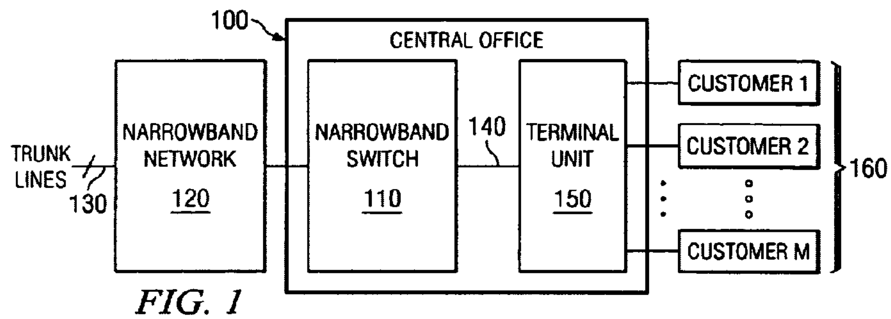
FIG. 1 is a block diagram of connections and equipment at a local telephone company Central Office (CO)
Figure 2:
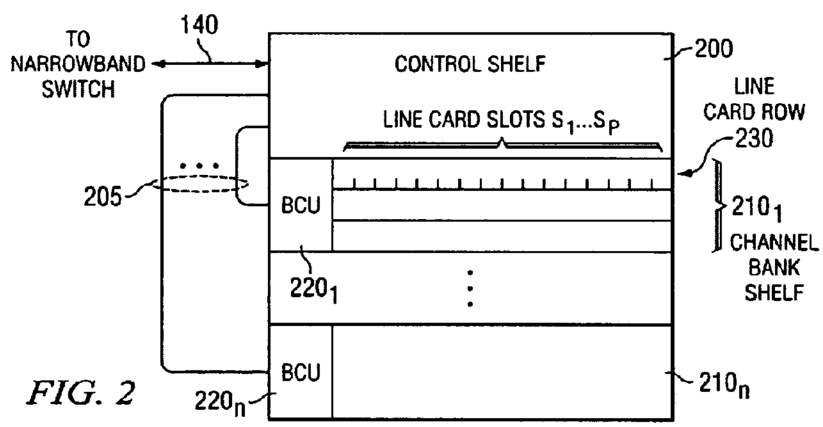
FIG. 2 is a block diagram of an access device (terminal unit) for providing customer access to a narrowband network.
Figure 7:
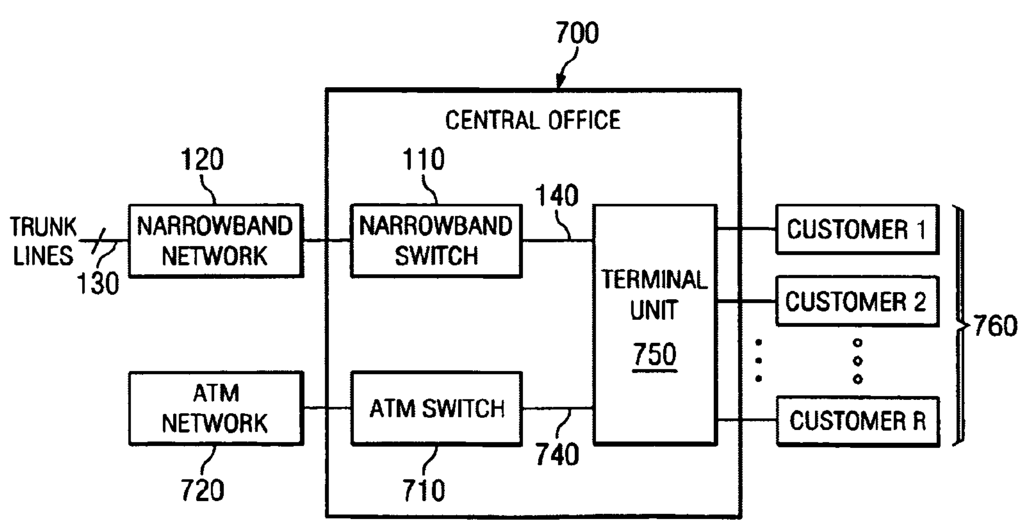
FIG. 7 is a block diagram of connections and equipment at a local telephone company central office configured according to the present invention and utilizing a terminal unit having line cards according to the present invention.

FIG. 7 illustrates the connections at a central office (CO) 700 having an ADSL/TDM access device (terminal unit) 750 utilizing ADLU line cards 500 configured according to the present invention. A narrowband switch 110 routes signals from the narrowband network 120 to the terminal unit 750 via a connecting cable 140, similar to the terminal unit 150 of FIG. 1. The central office 700 includes an AIM switch 710 that routes ATM signals from an ATM network 720 to the terminal unit 750 over a fiber link (ATM switch-ABCU fiber link 740). With the configuration of FIG. 7, customers 1 . . . m 760 may have available service from either or both the narrowband or ATM networks.

Figure 8:
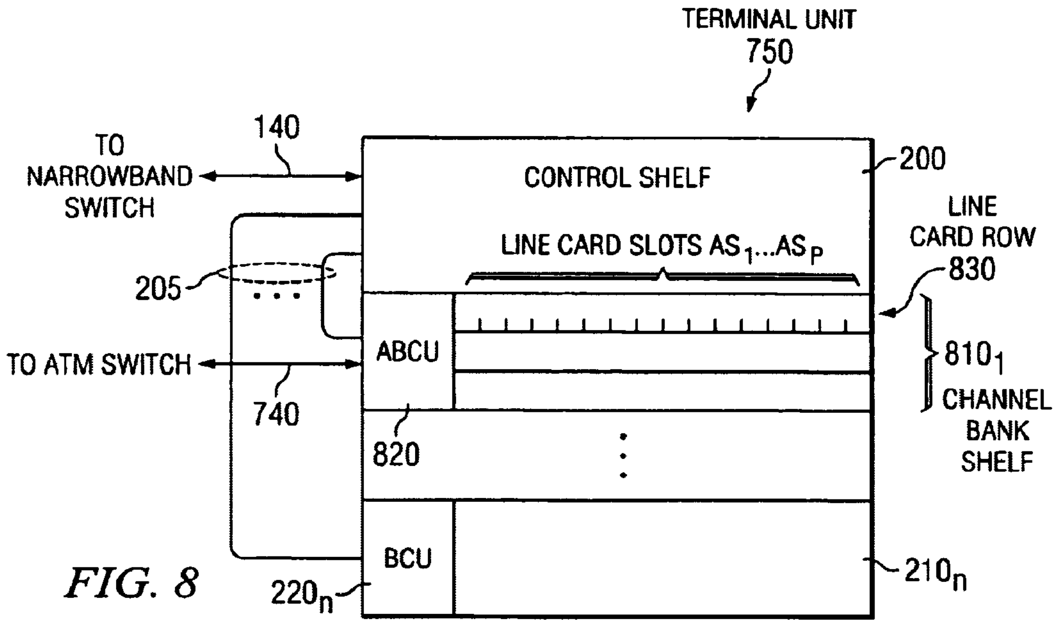
FIG. 8 is a block diagram of an access device (terminal unit) configured according to the present invention.

FIG. 8 illustrates an ADSL/narrowband access device (terminal unit) 750 configured to utilize one or more ADLU line cards 500 of the present invention. The terminal unit 750 includes a control shelf 200 connected to a connecting cable 140, and a channel bank (CB) shelf 810 similar to corresponding components in terminal unit 150. The CB shelf 810 differs from shelf 210 because the BCU 220 is replaced with an ADSL Bank Controller Unit (ABCU) 820. In addition to multiplexing narrowband signals between the control shelf 200 and line cards installed in the channel bank, the ABCU also multiplexes ATM signals received from the ATM switch 720 over the fiber link 740 to either the same or other cards installed in the CB shelf 810.

The channel bank shelf 810 includes three rows of line card slots $as_1 \ldots as_p$ 840 each capable of receiving either a standard line card (any one of $lc_1 \ldots lc_p$, for example) or an ADLU line card 500, for example. Any number of combinations of standard or upgraded line cards may be utilized to fill the slots, and slots may remain unfilled.

Figure 3:
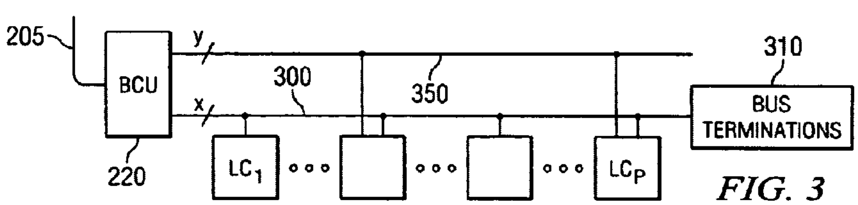
FIG. 3 is a block diagram illustrating a backplane that may be utilized in a typical electronic device (terminal unit of FIG. 2, for example)
Figure 4:
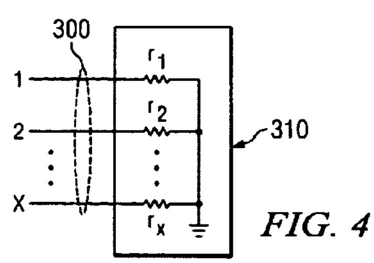
FIG. 4 is an expanded view of the backplane of FIG. 3, illustrating individual terminations of bus lines in the backplane.
Figure 9:
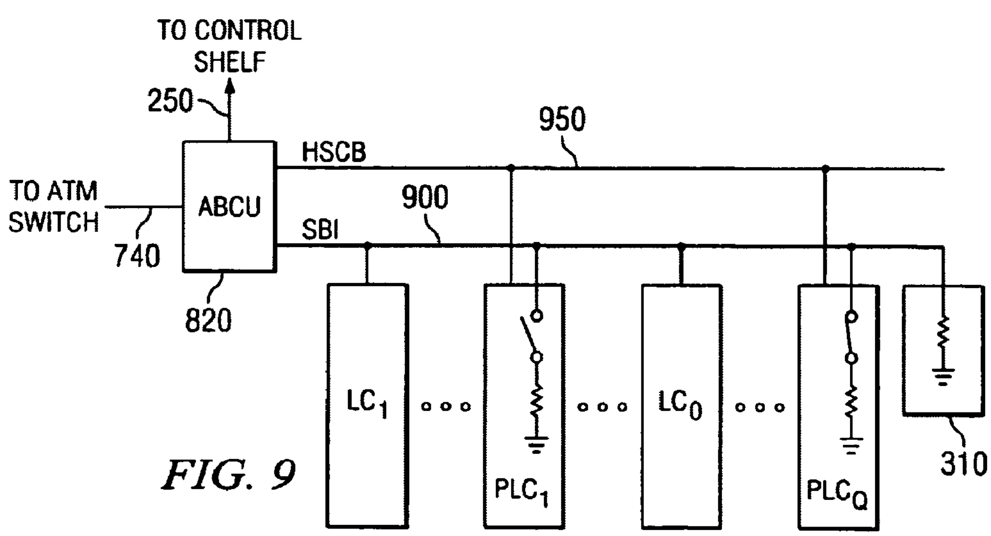
FIG. 9 is an illustration of a the backplane of FIG. 3 upgraded to utilize undetermined traces for carrying high speed data and control signals according to the present invention.

The backplane of the CB shelf 810 is illustrated in FIG. 9, and is the same backplane shown in FIG. 3, with the terminated bus 300 configured as a subscriber bus 900, and the unterminated bus 350 configured as a High Speed Cell Bus (HSCB) 950 terminated by one of the programmable line cards $plc_1 \ldots plc_q$.

Each of the subscriber bus 900 and HSCB 950 are connected to the ABCU 820. The ABCU 820 multiplexes narrowband signals to/from corresponding line cards installed in the CB shelf 810 and the control shelf 200 over the subscriber bus 900. The ABCU 820 also multiplexes ATM signals to/from corresponding line cards, including at least one programmable line card (ADLU line card 500, for example), configured according to the present invention, and the ATM switch 710 over the HSCB 950.

Although discussed herein as a single unit, the ABCU 820 is a redundant unit composed of a primary ABCU unit and a backup unit. The HSCB 950 has 10 lines, 5 lines connecting all line card slot $as_1 \ldots as_p$ to the primary ABCU and 5 lines connecting all line card slot $as_1 \ldots as_p$ to the backup unit.

Table 1 illustrates the pin configuration of HSCB connections made between the ADLU line card 500 and the HSCB 950 (see connection 520, FIG. 5A). Five primary pins, and five backup pins are allocated for the HSCB 950, representing primary and secondary (backup) bus lines. As shown by the pin configuration in Table 1, the primary and secondary bus lines are interleaved, reducing crosstalk and other interferences between active lines. The backup bus lines are normally off (not utilized).

A clock utilized by the bus which occupies one primary and one secondary bus line. In this example, the clock is 16.384 MHZ and both edges of the clock signal are utilized, effectively doubling the HSCB clocking rate, resulting in a data rate of 16.384×2×4 (clock×edges×lines). In other embodiments, different clock rates and pin configurations may be applied. The connections for the ADLU card 500 are made utilizing a DIN96 part, for example, on the line card and a matching connector on the channel bank shelf where the card is installed.

TABLE 1

| HSCB | Pin # | Description |
|---|---|---|
| D[0] | C-30 | Primary Data |
| D[1] | C-28 | Primary Data |
| D[2] | C-26 | Primary Data |
| D[3] | C-24 | Primary Data |
| CK | C-15 | Clock 16.384 MHZ |
| BD[0] | C-31 | Backup Data |
| BD[1] | C-29 | Backup Data |
| BD[2] | C-27 | Backup Data |

TABLE 1-continued

| HSCB | Pin # | Description |
|---|---|---|
| BD[3] | C-25 | Backup Data |
| BCK | C-16 | Clock 16.384 MHZ |

The ABCU 820 may communicate with ADLU line cards installed in the channel bank shelf 810 via a CPU Cell Data Link (CCDL) control message format. The CCDL provides a control message link between the ABCU and ADLU line cards, including provisioning information and a message to inform an ADLU line card to set itself up as a high speed bus termination card. The CCDL may also be used by the ADLU line cards to transmit alarm conditions to the ABCU.

Also in FIG. 9, the various line cards $lc_1 \ldots lc_o$ are shown electrically connected to the subscriber bus 900, and programmable line cards $plc_1 \ldots plc_q$ are shown connected to both the subscriber bus 300 and the HSCB 950. However, other embodiments include any combination of unterminated and terminated bus connections made by the standard line cards and programmable line cards, the only requirement being that the physically last line card utilizing the HSCB 950 must have activated resistive terminations terminating the bus, all other cards electrically connected to the HSCB 950 having no termination resistors or inactive (unconnected) programmable resistor terminations.

Additionally, the present invention does not preclude any of resistive, capacitive, or inductive components connected to any particular trace of the HSCB 950, so long as it does not interfere with the effectiveness of the activated termination resistor corresponding to that trace.

The HSCB itself needs to be terminated to prevent reflections from occurring on the HSCB. If data transfers across the HSCB had slow rise times, termination might not be required. However, the HSCB is used to transport downstream traffic from ABCUs to ADLUs on the backplane. The bus is designed using modified GTL logic technology which operates at 16.383 MHZ data and clock (both edges of clock are used) therefore providing a bandwidth equal to 131.072 MHZ for each row of cards.

The HSCB consists of five point to multi-point signal lines (four data signals and one clock signal) driven by each ABCU card. These uni-directional signals are received by ADLU units (1 to 20, for example) and are terminated at the power supply end of the backplane. The termination has been designed to be a resistive load to the electronic ground. The decreased impedance from termination prevents/minimizes reflections.

As discussed above, in this embodiment, the programmable line card (ADLU line card 500, for example) receives a command message that initiates programming on the line card to activate and deactivate the termination resistors. The command message is sent from any processor or control device having access to either the HSCB 950 or the subscriber bus 900, and may be formatted as a CCDL or a provisioning message. In other embodiments, the command message may take the form of a signal received on the programable line card from any control device able to access the line card. The control device issuing the command message may also utilize communications over the subscriber bus 900 to determine status of any of the cards present in the CB shelf 810 (make interrogatories, receive alarm conditions, accept broadcast information describing capabilities of installed cards, etc.).

In one embodiment, the downstream SBI bus is used to send activate commands that control the state of the resistive terminations and the upstream SBI bus is used to detect the state of the resistive terminations. The control commands are originated by hardware/software at the common control shelf. Alternatively, the upstream SBI bus and the downstream SBI bus may be utilized in conjunction with control commands originating at the ABCU level to create a faster way to detect and activate the resistive terminations.

Figure 10:
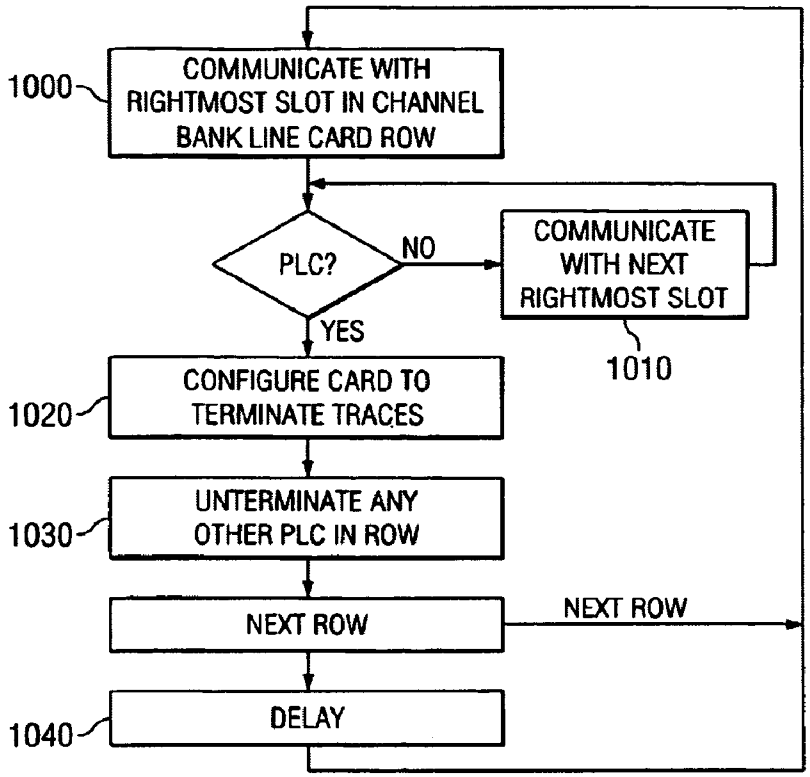
FIG. 10 is a flow chart illustrating the decisions made at a control unit for determining a state of programmable resistive terminations at plural line cards installed in the access device at FIG. 8.

An example program flow of a control device that issues command messages to the programmable line cards of the present invention is illustrated in FIG. 10. At step 1000, the control device sends an interrogatory to the rightmost line card slot in a selected channel bank shelf line card row (830, for example). The communication includes a determination of whether a line card is present in the rightmost slot (closest to a power supply end of the line card row, for example), and whether the line card present has programmable resistive terminations (loopback test, for example). If the line card is not programmable, not present, or not functioning, the next rightmost slot is sent a similar interrogatory (step 1010).

In one embodiment, the above interrogatory is sent to the line card over the subscriber bus. Since the subscriber bus is point-to-point, the ABCU knows which edgecard pins connect to the rightmost, next rightmost, etc., line card slot. Alternatively, the interrogatory may be performed via the HSCB 950 in conjunction with an identifying command sent over the subscriber bus.

The above process is repeated until the rightmost functioning line card having programmable resistive terminations is found. At step 1020, the command message is sent to configure the programmable line card to terminate the HSCB 950. Once the rightmost line card is terminated, the line card previously set as the termination line card is sent a command to place its programmable resistive terminations in the unterminated state (step 1030). This process insures that the rightmost line card in each row is terminated. Alternatively, a command message configuring one card to terminate the HSCB 950 may simultaneously signal other card(s) to disable any current termination configurations.

After the rightmost programmable line card is set up to terminate the HSCB 950, a delay may be implemented (step 1040) to allow settle time and/or allow other processes to execute. The above process may be repeated at an appropriate interval to assure that the HSCB bus remains terminated by one of the programmable line cards.

In another embodiment, step 1030 is performed prior to step 1000, placing all line cards in an unterminated state prior to activating the termination resistors on the rightmost programmable line card. Other variations of the activation program are clearly possible by varying or altering steps in accordance with the main function of the program which is to terminate the HSCB 950 using a primary (rightmost, physically last) programmable line card.

Re-interrogation of the line cards occurs at appropriate intervals or upon receipt of an alarm condition indicating an error condition on an installed ADLU line card. For example, if the terminating ADLU line card is removed from the channel bank, the next round of interrogatories would recognize a fail condition on the terminating ADLU and search to find a secondary ADLU line card and send a terminate command to the secondary ADLU so that the HSCB 950 is properly terminated. Alternatively, the control device program may store the address of a secondary ADLU line card and activate the terminating resistors immediately upon receipt of an alarm condition. Other variations are possible, so long as the program (software) is able to recognize loss of the terminating ADLU and activate the secondary to maintain a fully terminated HSCB to prevent cell losses.

In other embodiments, the ADLU line cards are required to be placed in at least a predetermined number of the card slots of the channel bank shelf line card row (two rightmost slots, for example), therefore limiting the number of line card slots that need to be interrogated for ADLU presence, status, etc.

The commands sent to the programmable line card may be of any form or structure to communicate the intended termination instruction. Table 2 provides a sample listing of command and reply messages issued from/to the control shelf 200.

TABLE 2

| Name | Description |
|---|---|
| tAdslProvMsg | Provisioning an ADSL facility |
| eAdslAlmType | Transient Alarm message (autonomous from line card) |
| tRtrvPmRequestMsg | Performance Monitoring (PM) Request |
| tInitPmMsg | Initialize PM data registers |
| tLcToTaskMsgMsg | Reply message |

Figure 11:
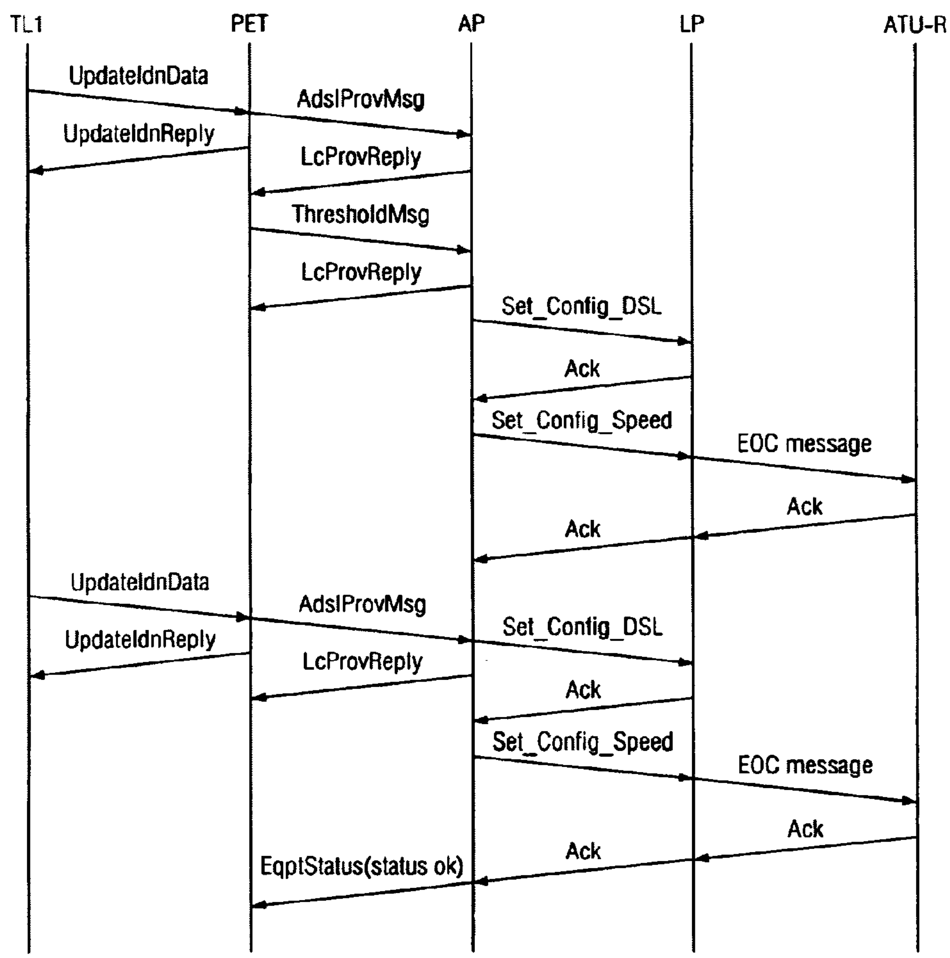
FIG. 11 is a flow diagram illustrating the sequence of example provisioning messages communicated between a control shelf and a terminal unit line card.

An example flow of the messages through a system such as ADSL/Narrowband access device (terminal unit) 750 is shown in FIG. 11. An UpdateIdnData message is issued by a main control function (TL1) and received by a Peripheral Equipment Task (PET). The PET replies to TL1 and issues an AdslProvMsg to an AP. The PET is responsible for configuring equipment devices (line cards, for example) installed in the terminal unit 750.

The ADSLProvMsg is a provisioning message identifying a specific equipment configuration. The AP is an Administration Processor resident on an equipment device installed in the terminal unit (a line card in this example). The AP handles message communications with the control shelf (ADSLProvMsg, for example) and manages the backplane interface gate array. The AP may be implemented in ADLU processor 570, for example.

The structure of an ADSLProvMsg is shown in Table 3.

TABLE 3

```
typedef struct tAdslParams
{
word AdslConfig;              /* see bit definitions above */
word MinimumSpeed;            /* Minimum ADSL speed (kbps) */
word MaximumSpeed;            /* Maximum AWSL speed (kbps) */
} tAdslParams;
typedef struct tAdslProvMsg
{
eMsgId        MsgId;              /* __AdslProvMsg__ */
ulng          CurrentTime         /* In seconds since 1/1/89 */
tAdslParams   UpstreamParams;     /* Upstream ADSL params */
tAdslParams   DownstreamParams;   /* Downstream ADSL params */
word          UpAdslParams;       /* Upstream ADSL params */
word          DownstreamParams;   /* Downstream ADSL params */
word          LpbkConfig;         /* Loopback provisioning bits */
word          LpbkTimeout;        /* Loopback timeout period
              (seconds) */
byte          RoutingTagId1;      /* Routing Tag ID 1 */
byte          RoutingTagId2;      /* Routing Tag ID 2 */
word          TranslationVpi;     /* Translation GFC/VPI */
word          TranslationVci;     /* Translation VCI */
word          AdslFlags;          /* Miscellaneous bit flags */
} tAdslProvMsg;
```

The ADSLProvMsg message contains information regarding ADLU setup and includes a configuration for termination resistors if applicable to the line card which the message is sent to. For example, the AdslFlags or other storage location contains data reflecting whether all or specific of the termination resistors should be activated (for example, AdslFlags /*Miscellaneous bit flags */, or other storage location). Alternatively, an additional storage location may be added to the AdslProvMsg or other structures maintained therein to hold the termination resistor configuration.

The AP sends a number of messages to a Line Processor (LP) (ADLU ASIC 560, for example), that controls both the ADSL communications line and the ADLU line card 500. Table 4 lists example command messages sent from the AP to the LP.

TABLE 4

| Command Message | Reply Message | As Autonomous Message |
|---|---|---|
| PingCmdIpMsg | PingReplyIpMsg | No |
| ResetCmdIpMsg | ResteReplyIpMsg | No |
| SetClockCmdIpMsg | SetClockReplyIpMsg | No |
| ReadCtockCmdIpMsg | ReadClockReplyIpMsg | No |
| ReadIdAtuCCmdIpMsg | ReadIdAtuCReplyIpMsg | Yes |
| ReadIdAtuRCmdIpMsg | ReadIdAtuRReplyIpMsg | No |
| SetConfigDslCmdIpMsg | SetConfigDslReplyIpMsg | No |
| ReadConfigDslCmdIpMsg | ReadConfigDslReplyIpMsg | No |
| SetConfigSpeedCmdIpMsg | SetConfigSpeedReplyIpMsg | No |
| ReadConfigSpeedCmdIpMsg | ReadConfigSpeedReplyIpMsg | No |
| Read15MinPmCmdIpMsg | Read15MinPmReplyIpMsg | No |
| ReaclDailyPmCmdIpMsg | ReadDailyPmCmdIpMsg | No |
| ClearPmCmdIpMsg | ClearPmReplyIpMsg | No |
| ReadStatusCmdIpMsg | ReadStatusReplyIpMsg | Yes |
| SelfTestCmdIpMsg | SelfTestReplyIpMsg | No |
| LoopbackCmdIpMsg | LoopbackReplyIpMsg | No |
| LoadStartCmdIpMsg | LoadStartReplyIpMsg | No |
| LoadDataCmdIpMsg | LoadDataReplyIpMsg | Yes |
| LoadEndCmdIpMsg | LoadEndReplyIpMsg | No |
| LoadEndCmdIpMsg | LoadAbortReplyIpMsg | No |
| LoadSwitchCmdIpMsg | LoadSwitchCmdIpMsg | No |

Continuing with the example flow of FIG. 11, the AP acknowledges receipt of the ADSLProvMsg, and issues a Set_Config_DSL message to an LP. The LP is a Line Processor (ADLU ASIC 560, for example) that controls both the ADSL communications line and the configuration of the ADLU line card 500. The Set_Config_DSL message received at the LP invokes the programming required to set the ADLU line card configuration (terminations active or inactive) as identified in the configuration message.

Each of the programmable line cards also include status indicators identifying a current state of the card. Table 5 illustrates an example format of indicating lights (LEDS, for example) and the state represented. Additional states and indicators may be provided.

TABLE 5

| Function | LED | Description |
|---|---|---|
| ADSL | Green | ADSL link is active and normal (sync-up). Cell delineation successful. |
| | Flashing Green | Flashes green momentarily when intermittent cell delineation errors are detected on either end of loop. |
| | Off | ADSL link is not present. No cell delineation. |
| Fail | Red | |
| | Off | |

TABLE 5-continued

| Function | LED | | Description |
|---|---|---|---|
| BUSY | Green | | Upstream or downstream ATM data cell traffic is passing through the ADLU |
| TERMINATION | Green | Off | Non-terminating board |
| STATUS | Green | On | Terminating board |

The termination status led is controlled by circuitry maintained on the ADLU line card 500 (ADLU ASIC 560, for example). In one embodiment, the LEDS have circuitry connected to the termination status register 590 (for example) that controls whether the led is lit or flashing. Alternatively, the LEDs may be controlled by a command received from either the subscriber bus or HSCB 950, based on status retrieved from the ADLU line card 500 as discussed above with reference to FIG. 6 (as one example implementation).

Figure 12:
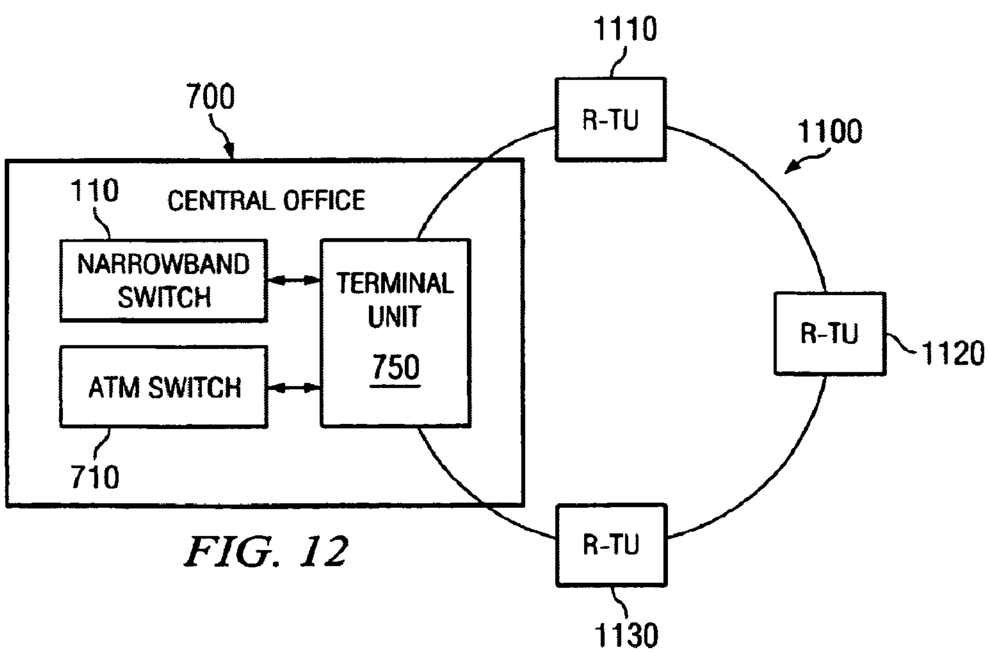
FIG. 12 is a block diagram illustrating plural terminal units configured according to the present linked by a SONet ring.

The access device (terminal unit) 750 of the present invention need not be present at a central office. In FIG. 12, remote terminal units (R-TU, 1110, 1120, and 1130, for example) are located outside the central office and connected to each other and terminal unit 750 via a SONet ring 1100. Such a configuration allows a terminal unit to be placed in close proximity to end user customers without additional constraints imposed by the physical location of the central office itself.

The present invention as discussed herein has been described in reference to a telecommunications access device. However, the present invention may be applied to numerous electronic devices of varying configurations. Therefore, the present invention is not limited to line cards in a terminal unit or to telecommunication related equipment, but may be directly applied (with or without line cards) in any electronic device including, but not limited to, image processing, radar devices, and electronic storage devices, for example.

The present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrives, and magneto-optical disks, ROMS, RAMs, EPROMs, EEPROMS, magnetic or optical cards, nanosystems, or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the steps necessary to carry out state changes of programmable resistive terminations, the sending of commands directing those state changes, and retrieving status with regard to the state of programable resistive terminations (or other functions of the ADLU line card 500) as described above.

Included in the programming (software) of the general/specialized computer or microprocessor are software modules for implementing the teachings of the present invention, including, but not limited to, identifying commands, terminating and opening traces, sending identifiers, determining cards for termination, directing line card operations, and the display, storage, or communication of results according to the processes of the present invention.

Obviously, numerous modifications and variations of the present invention are possible in light of the above teachings. It is therefore to be understood that within the scope of the appended claims, the invention may be practiced otherwise than as specifically described herein.

What is claimed is:

1. A communications access device providing subscriber access to a high speed communication line, comprising:

a backplane connected to said high speed communications line;

plural line cards connecting said backplane to at least one subscriber line;

wherein at least one of said plural line cards comprises at least one programmable resistor termination, and means for receiving commands for programming said at least one resistor termination;

a control unit configured to transmit said commands across said backplane to at least one of said line cards;

wherein said control unit is further configured to send messages to the line cards having programmable resistor terminations, said messages containing programming steps to at least one of activate and deactivate the programmable resistor terminations that are stored in a memory on said line cards and executed upon receipt of a command to initiate any one of said programming steps.

2. The communications access device according to claim 1, wherein said messages are formatted as an ADSL provisioning message.

3. The communications access device according to claim 1, wherein said messages are transmitted between the control unit and the line cards in CPU Cell Data Linc (CCDL) format.

4. The communications access device according to claim 1, wherein:

said control unit transmits said commands across a point-to-point communication to a specific line card; and each programmable resistor termination is configured to one of terminate and not terminate traces connected to a point-to-multipoint bus.

5. A method of operating an electronic device, comprising the steps of:

identifying a last programmable line card installed on a bus of said electronic device; and configuring the last programmable line card to terminate said bus by activating programmable termination of said last programmable line card connected to said bus;

wherein said step of identifying comprises the steps of:

sending an interrogatory message from a control device to a last line card slot connected to said bus to determining, based on one of a return message from a line card installed in the last line card slot and lack of a return message, whether said last line card slot contains a line card having programmable line card terminations; and repeating said steps of sending and determining on a next line card slot until a line card closest to said last line card slot and having programmable line card terminations is identified.

6. The method according to claim 5, wherein said step of sending comprises sending said interrogatory message across a point-to-point bus connecting said control device to the line card slot being interrogated.

7. The method according to claim 5, wherein said step of configuring comprises the steps of:

sending a message containing configuration information from said control device to said last programmable line card; and setting the programmable terminations on said last programmable line card according to said configuration information.

8. The method according to claim 7, wherein said step of sending comprises sending said message across a point-to-point bus from said control device to said last programmable line card.

9. A line card device, comprising:

at least one programmable impedance termination; and a receiving device configured to receive commands for programming each impedance termination;

wherein said receiving device comprises, a connection device configured to connected said line card device to a backplane, and a command reading device configured to read commands sent to said line card device across said backplane.

10. The line card device according to claim 9 wherein: each programmable resistor termination comprises, an impedance connected serially with a programmable switch between a trace on said line card and one of an electrical ground, an artificial ground, and a reference voltage.

11. The line card device according to claim 9, wherein said command reading device is further configured to interpret a provisioning message containing configuration information for each programmable impedance termination on said line card.

12. The line card device according to claim 11, wherein said configuration information is contained in bits of said provisionary message maintained by a pre-existing storage location.

13. The line card device according to claim 9, wherein said commands each initiate a predetermined sequence of events to carry out said programming.

14. The line card device according to claim 9 further comprising:

a sequence receiving device configured to receive and store the predetermined sequence of events corresponding to each programming command.

15. The line card device according to claim 9, wherein said predetermined sequence of events includes the steps of:

identifying the impedance terminations corresponding to a command received;

determining a programmed state for the corresponding impedance terminations according to the command received; and directing the corresponding resistor terminations to the programmed state.

16. The line card device according to claim 9, further comprising:

a non-volatile memory device configured to store instructions corresponding to each of said commands.

17. The line card device according to claim 9, further comprising:

an instruction receiving device configured to receive said instructions across a backplane from said control unit, and store said instructions in the memory device.

18. The line card device according to claim 9, wherein:

each programmable impedance termination comprises a switch configured to one of establish and break a series connection between each of a trace on said line card, an impedance device, and ground.

19. The line card device according to claim 9, wherein:

each programmable impedance termination comprises a switch and an impedance device connected in series between a trace and a termination node.

20. The line card device according to claim 18, wherein said switch is a crossbar switch.

21. The line card device according to claim 18, wherein said impedance device is a resistor.

22. The line card device according to claim 18, wherein each switch is maintained on an IC.

23. The line card device according to claim 9, further comprising a state register configured to maintain a state of each programmable impedance termination.

24. The line card device according to claim 9, further comprising:

a state register configured to maintain a state of each programmable impedance termination;

wherein said programming is carried out by writing the state of the impedance terminations corresponding to said commands in said state register.

25. The line card device according to claim 9, wherein said receiving device is configured to receive commands structured as an ADSL provisioning message containing configuration information for each programmable impedance termination on said line card.

26. The line card device according to claim 18, wherein said provisioning message is received in CPU Cell Data Link (CCDL) format.

27. The line card device according to claim 9, wherein:

said receiving device receives said commands over traces configured to be connected to a point to point bus.

28. The line card device according to claim 11, wherein:

said command reading device if further configured to be connected to a point-to-point bus and to receive said provisionary message in a point-to-point message format across said connection device.

29. The line card device according to claim 28, wherein said programmable impedance terminations, when activated by said programming, terminate traces configured to be connected to multipoint bus.

30. A method of operating a line card having at least one programmable impedance termination for traces on said line card, comprising the steps of:

receiving at least one command from a command unit indicating a state of the impedance terminations; and executing the received commands by performing steps necessary to place the impedance terminations in the indicated state;

wherein said step of executing comprises the step of:

identifying impedance terminations corresponding to a command received;

determining a programmed state for the corresponding impedance terminations according to the command received; and directing the corresponding impedance terminations to the programmed state.

31. The method according to claim 30, further comprising the steps of:

receiving instructions for placing said impedance terminations in at least one state; and storing said instructions on said line card;

wherein said step of executing includes the step of retrieving at least one of the stored instructions for performing said steps.

32. The method according to claim 30, wherein said step of receiving comprises receiving an ADSL provisioning message containing configuration information of said state for each programmable impedance termination on said line card.

33. The method according to claim 32, wherein said step of executing includes the step of initiating a program stored on said line card for placing the impedance terminations in the indicated state.

34. The method according to claim 30, wherein said step of executing includes the step of initiating a program stored on said line card for placing the impedance terminations in the indicated state.

35. The method according to claim 30, wherein said step of executing includes the steps of:

making a series connection between each of a resistive device of at least one of the programmable impedance terminations, corresponding of said traces, and ground;

maintaining a series connection between each of an impedance device of at least one of the programmable impedance terminations, corresponding of said traces, and ground; and breaking a series connection between each of an impedance resistive device of at least one of the programmable impedance terminations, corresponding of said traces, and ground.

36. The method according to claim 30, wherein said step of executing comprises the step of:

writing a value representing the indicated state of the impedance terminations to a state register.

37. The method according to claim 36, wherein said step of executing further comprises the step of:

utilizing said state register to determine a position of a switch of each programmable impedance termination, each switch able to make a series connection between a corresponding trace, an impedance element of the programmable resistor termination, and ground.

38. The method according to claim 30, wherein said step at receiving comprises the step of:

receiving said at least one command from a CPU Cell Data Link (CCDL).

39. The method according to claim 30, wherein said step of receiving includes the step of:

receiving said at least one command in a point-to-point message format.

40. The method according to claim 30, wherein said step of executing includes the step of:

placing the programmable resistive terminations in one of termination state or no termination state on traces configured to connect to a point-to-multipoint bus.

41. A method for executing commands received by a line unit adapted to be connected to a backplane, comprising the steps of:

said line unit receiving commands calling for said line unit to one of terminate or not terminate a subject trace on a backplane bus;

said line unit storing an indication of whether the most recent of said commands called for said line unit to terminate or to not terminate said subject trace;

said line unit receiving queries calling for said line unit to indicate the state of its termination of said subject trace; and said line unit responding to said queries with the indication most recently stored in said step of storing an indication;

the step of said line unit terminating said subject trace in response to said line unit receiving a command calling for said line unit to terminate said subject trace.

42. A method according to claim 41, further comprising the step of said line unit disconnecting a termination impedance from said subject trace in response to said line unit receiving a command calling for said line unit to not terminate said subject trace.

43. A method according to claim 41, wherein said step of said line unit responding to said queries with the indiction most recently stored in said step of storing an indication, comprises the steps of, in response to each given one of said queries:

determining whether said line unit is currently terminating said subject trace; and responding to said given query with the determination made in said step of determining.

44. A method according to claim 41, wherein said backplane includes a point-to-point bus and a point-to-multipoint bus, said point-to-multipoint bus including said subject trace.

45. A method according to claim 44, wherein said point-to-point bus is terminated on said backplane and said subject trace is unterminated on said backplane.

* * * * *